United States Patent
Gong et al.

(10) Patent No.: US 9,818,208 B2
(45) Date of Patent: *Nov. 14, 2017

(54) IDENTIFYING AND ABSTRACTING THE VISUALIZATION POINT FROM AN ARBITRARY TWO-DIMENSIONAL DATASET INTO A UNIFIED METADATA FOR FURTHER CONSUMPTION

(71) Applicants: Zhiyong Gong, Shanghai (CN); TianMin Huang, Shanghai (CN); Leo Chi-Lok Yu, Tsuen Wan (HK); HongGang Zhang, Shanghai (CN); Jun Che, Shanghai (CN)

(72) Inventors: Zhiyong Gong, Shanghai (CN); TianMin Huang, Shanghai (CN); Leo Chi-Lok Yu, Tsuen Wan (HK); HongGang Zhang, Shanghai (CN); Jun Che, Shanghai (CN)

(73) Assignee: Business Object Software Limited, Dublin (IE)

( * ) Notice: Subject to any disclaimer, the term of this patent is extended or adjusted under 35 U.S.C. 154(b) by 588 days.

This patent is subject to a terminal disclaimer.

(21) Appl. No.: 14/276,802

(22) Filed: May 13, 2014

(65) Prior Publication Data
US 2014/0337703 A1  Nov. 13, 2014

Related U.S. Application Data

(63) Continuation of application No. 12/477,830, filed on Jun. 3, 2009, now Pat. No. 8,725,775.

(51) Int. Cl.
*G06F 17/30* (2006.01)
*G06T 11/20* (2006.01)
*G06F 17/24* (2006.01)

(52) U.S. Cl.
CPC .......... *G06T 11/206* (2013.01); *G06F 17/243* (2013.01); *G06F 17/246* (2013.01);
(Continued)

(58) Field of Classification Search
CPC .................. G06F 17/243; G06F 17/30958
See application file for complete search history.

(56) References Cited

U.S. PATENT DOCUMENTS 6,301,579 B1 * 10/2001 Becker .............. G06F 17/30592
2007/0156749 A1 * 7/2007 Levin .................. G06N 99/005
(Continued)

*Primary Examiner* — Grace Park
(74) *Attorney, Agent, or Firm* — Mintz Levin Cohn Ferris Glovsky and Popeo, P.C.

(57) ABSTRACT

A system and method for determining a set of visualization points from any given two-dimensional dataset to best describe a given visual analytic. A first user selection is received in a data processing apparatus for a chart. A chart type associated with the first user selection is identified for the chart. One or more visualization strategies are accessed from a strategy pool database based on the chart type. A second user selection is received in the data processing apparatus for a two-dimensional dataset from a data provider in communication with the data processing apparatus. The two-dimensional dataset is analyzed to determine a best strategy from the one or more visualization strategies accessed from the strategy pool database. Metadata representing the two-dimensional dataset is generated based on the best strategy, and a display representing the metadata is generated to visualize the two-dimensional dataset according to the best strategy.

14 Claims, 16 Drawing Sheets

(52) U.S. Cl.
CPC .. *G06F 17/30572* (2013.01); *G06F 17/30941* (2013.01); *G06F 17/30958* (2013.01); *G06F 17/30991* (2013.01)

(56) References Cited

U.S. PATENT DOCUMENTS

| 2008/0005677 A1* | 1/2008 | Thompson | G06Q 10/00 715/744 |
| 2008/0180458 A1* | 7/2008 | Favart | G06F 9/455 345/630 |

\* cited by examiner

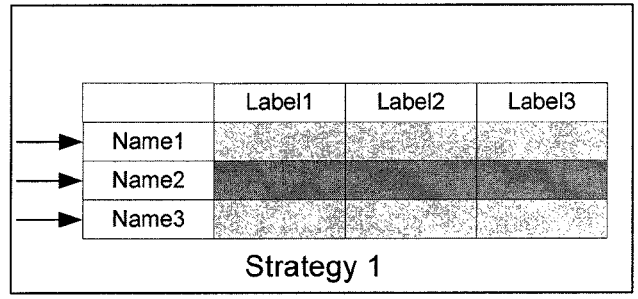

$$Strategy1(m \times n) = \begin{cases} CategoryLabels = [H_2 1, H_3 1, \cdots, H_n 1] \\ SeriesData = \begin{bmatrix} series_1 \cdot \begin{cases} seriesName : H_2 1 \\ data : [H_2 2, H_3 2, \cdots, H_n 2] \end{cases} \\ \cdots \\ series_{i-1} \cdot \begin{cases} seriesName : H_i 1 \\ data : [H_2 i, H_3 i, \cdots, H_n i] \end{cases}, (i \in N, 2 \leq i \leq n) \\ \cdots \\ series_{n-1} \cdot \begin{cases} seriesName : H_n 1 \\ data : [H_2 n, H_3 n, \cdots, H_n n] \end{cases} \end{bmatrix} \end{cases}$$

$(m \in N, n \in N, 2 \leq m \leq \infty, 2 \leq n \leq \infty)$

FIG. 10

1006 (left) — 1002 (top) — 1008 (right)
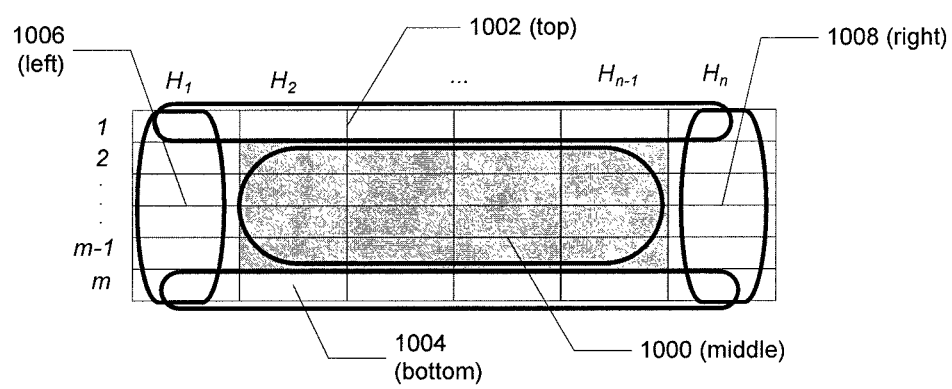
1004 (bottom) — 1000 (middle)
The following lists all arrangements of the dataset, where the grey area indicates the Series Data
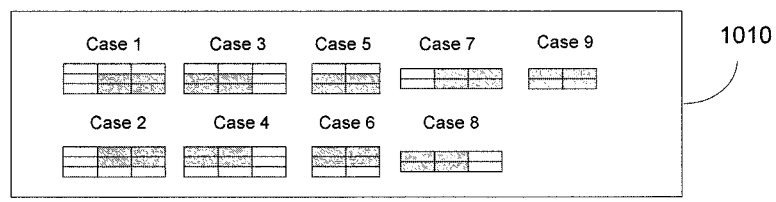
1010
FIG. 13

IDENTIFYING AND ABSTRACTING THE VISUALIZATION POINT FROM AN ARBITRARY TWO-DIMENSIONAL DATASET INTO A UNIFIED METADATA FOR FURTHER CONSUMPTION

CROSS REFERENCE TO RELATED APPLICATION

This is a continuation of U.S. application Ser. No. 12/477,830 filed Jun. 3, 2009, issuing under U.S. Pat. No. 8,725,775 on May 13, 2014 entitled IDENTIFYING AND ABSTRACTING THE VISUALIZATION POINT FROM AN ARBITRARY TWO-DIMENSIONAL DATASET INTO A UNIFIED METADATA FOR FURTHER CONSUMPTION, the disclosure of which is incorporated herein by reference.

BACKGROUND

This disclosure relates generally to computer system visualization tools, and more particularly to an apparatus and method for identifying and abstracting the visualization point (which best describes a given visual analytic) from an arbitrary two-dimensional dataset into a unified metadata for further consumption.

Today, algorithms exist that allow a data consumer to take a dataset as input, and then determine the best visual analytic to describe it. A visual analytic can be any visual component for display in a graphical user interface, such as, for example, a line chart. In the case where both the dataset and the visual analytic(s) are defined, one method is to determine a visualization point from the given dataset that best describes the given visual analytics. The term "visualization point" refers to data, including data point, category labels, series names, etc., that will be displayed in the visual analytic. However, this method can only handle a trivial dataset, and requires human interaction to handle the more advanced dataset.

Take Xcelsius as an example. Xcelsius is a data visualization software product that consumes static data such as an Excel data model, and transforms it into visual analytics (i.e. interactive visual interfaces) to provide improved business insight, analytical reasoning, and management. Because it is often the case that an Excel data model in an organization is created long before the organization adopts a product like Xcelsius, it is costly and difficult to re-do or adjust all data models for the Xcelsius consumption. In other words, it becomes a requirement for Xcelsius to offer a smarter way to take any existing data model (or dataset) for consumption of the visual analytic, in addition to the trivial dataset.

Another example is the "Whohar Community" project in SAP's Business Objects On-Demand offering. The goal of the Whohar Community is to provide a marketplace between the data provider (who contributes the mass volume of data to a Whohar server repository) and the data consumer (who consumes the data to produce the visualization). In the nature of the Internet, the data provider and the data consumer are often disconnected. Therefore, the data consumer often needs to make a best guess about the data (unless the data schema is present during the time of consumption), or the data provider is left to format its data in only the most obvious way.

Data visualization can help to quickly provide business insight on a mass volume of data. There are two ends in the data visualization: Data Provider and Data Consumer (e.g. Chart Engine, or Visual Analytic engine in this case). The Data Provider is the system (or process) to provide the dataset (e.g. database, spreadsheet, etc), while the Chart Engine is the system (or process) to take the dataset as input and create the visual representation (e.g. bar chart). In the common approach, the Data Provider produces the dataset and formats it in the most relevant way so that the Chart Engine can most efficiently identify the visualization point for a given visual analytic.

There are at least two problems in this common approach: 1) complexity—the Data Provider can only format the dataset in the most trivial way, so both the Data Provider and the Data Consumer cannot deal with a complex scenario, at least not without human interaction; and 2) flexibility—the Data Provider and the Data Consumer (e.g. Chart Engine in this case) are very much tied together, such that the Data Provider often provides the dataset to only one particular Data Consumer for consumption. Compatibility issues exist if other Data Consumers want to consume the same piece of data.

For example, Business Objects' Xcelsius can create a visual analytic for a given dataset stored in Microsoft Excel (i.e. data provider) only if the dataset is formatted so that the series names and category labels are assumed to appear on the top or left region for the line chart. FIGS. 1A and 1B illustrate two scenarios that contain two datasets for the same visual analytic (e.g. line chart). FIG. 1A is an example of a trivial case, which is supported by existing methods, while FIG. 1B is an example of a complex case, which is presently unsupported, where no existing method is available and human interaction is required.

For the unsupported cases, the visual engine in currently available visualization tools requires human interaction to explicitly specify a mapping between the dataset and the visual analytic. When the user selects the dataset for the given analytic, the data in the dataset will then be extracted to match the internal data structure of the visual analytic.

SUMMARY

This document discusses a system and method for enabling a data consumer to consume a visualization point from any arbitrary two-dimensional dataset for a given visual analytic.

In summary, this document describes a system and method which can determine a set of visualization points (from any given two-dimensional dataset) to best describe and match the given one-dimensional and two-dimensional visual analytic. Because of the introduction of this best-match algorithm and strategy pool, the implementations described herein offer a flexible and open architecture which transforms any arbitrary data model into metadata of the visualization point for the selected visual analytic, without the human interaction of prior art solutions.

In accordance with some implementations, systems and methods are described to abstract the arbitrary dataset representation as the visualization point (stored as the metadata) for any given one-dimensional and two-dimensional visual analytics. The implementations described herein further provide a collection of data extraction strategies (e.g. a "strategy pool") that can be received from a user, and a set of built-in strategies, as well as provide the best match algorithm to select the best strategy for a given dataset and visual analytic. Furthermore, these implementations provide a method for the user to create new strategies for data extraction in a user-friendly approach, and allow the user to bind the dataset to any given one-dimensional or two-dimensional visual analytic using the user-friendly approach.

In one implementation, a system for abstracting a best visualization point describing a selected visual analytic from an arbitrary two-dimensional dataset is described. The system includes computer program instructions encoded on a computer readable medium for execution by a data processing apparatus, the computer program instructions being organized into a number of functional modules. The functional modules include a data provider module adapted to access data from a data source and to abstract the accessed data into the two-dimensional dataset, a data extraction module adapted to receive the two-dimensional dataset, determine the visualization point from the two-dimensional dataset, and format the visualization point as metadata, and a data visualization module adapted to generate a one-dimensional or two-dimensional visual representation of the two-dimensional dataset based on the metadata.

In other implementations, a system for abstracting a best visualization point describing a selected visual analytic from an arbitrary two-dimensional dataset includes computer program instructions encoded on a computer readable medium for execution by a data processing apparatus. The computer program instructions cause the data processing apparatus to access data from a data source, abstract the accessed data into a two-dimensional dataset, determine the visualization point from the two-dimensional dataset, format the visualization point as metadata, and generate a one-dimensional or two-dimensional visual representation of the two-dimensional dataset based on the metadata.

In yet other implementations, a computer-implemented method for abstracting a best visualization point describing a selected visual analytic from an arbitrary two-dimensional dataset is presented. The method includes the steps of receiving in a data processing apparatus a first user selection for a chart, identifying a chart type associated with the first user selection for the chart, and accessing one or more visualization strategies from a strategy pool database based on the chart type. The method further includes receiving in the data processing apparatus a second user selection for a two-dimensional dataset from a data provider in communication with the data processing apparatus, and analyzing the two-dimensional dataset to determine a best strategy from the one or more visualization strategies accessed from the strategy pool database. The method further includes generating metadata representing the two-dimensional dataset based on the best strategy, and generating a display representing the metadata to visualize the two-dimensional dataset according to the best strategy.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 10 illustrates a mapping relationship between visual analytics and datasets.

FIG. 13 shows a best-match strategy by which a dataset can be divided into five regions.

Like reference symbols in the various drawings indicate like elements.

DETAILED DESCRIPTION

This document describes a system and method for determining a set of visualization points from any given two-dimensional dataset to best describe a given one-dimensional or two-dimensional visual analytic. The system and method execute a best-match algorithm having a set of built-in strategies and an expandable strategy pool. The systems and methods provide a flexible and expandable design which transforms any given arbitrary data model to produce a metadata description of the visualization point which best describes the selected visual analytic for the data consumer, without human input or interaction. Generally, the systems and methods described herein can be applied to any application (e.g. spreadsheet, visualization tool, etc.) which can take a two-dimensional dataset and provide a visual representation.

Figures 1A, 1B:
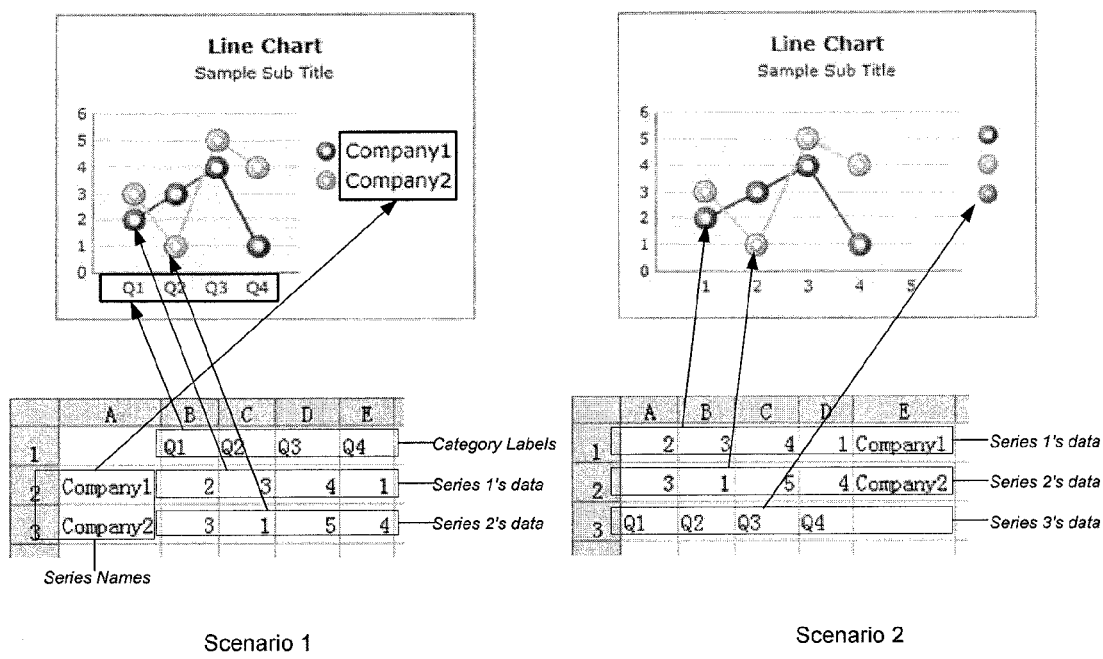
FIGS. 1A and 1B illustrate two scenarios that contain two datasets for the same visual analytic.
Figure 2:
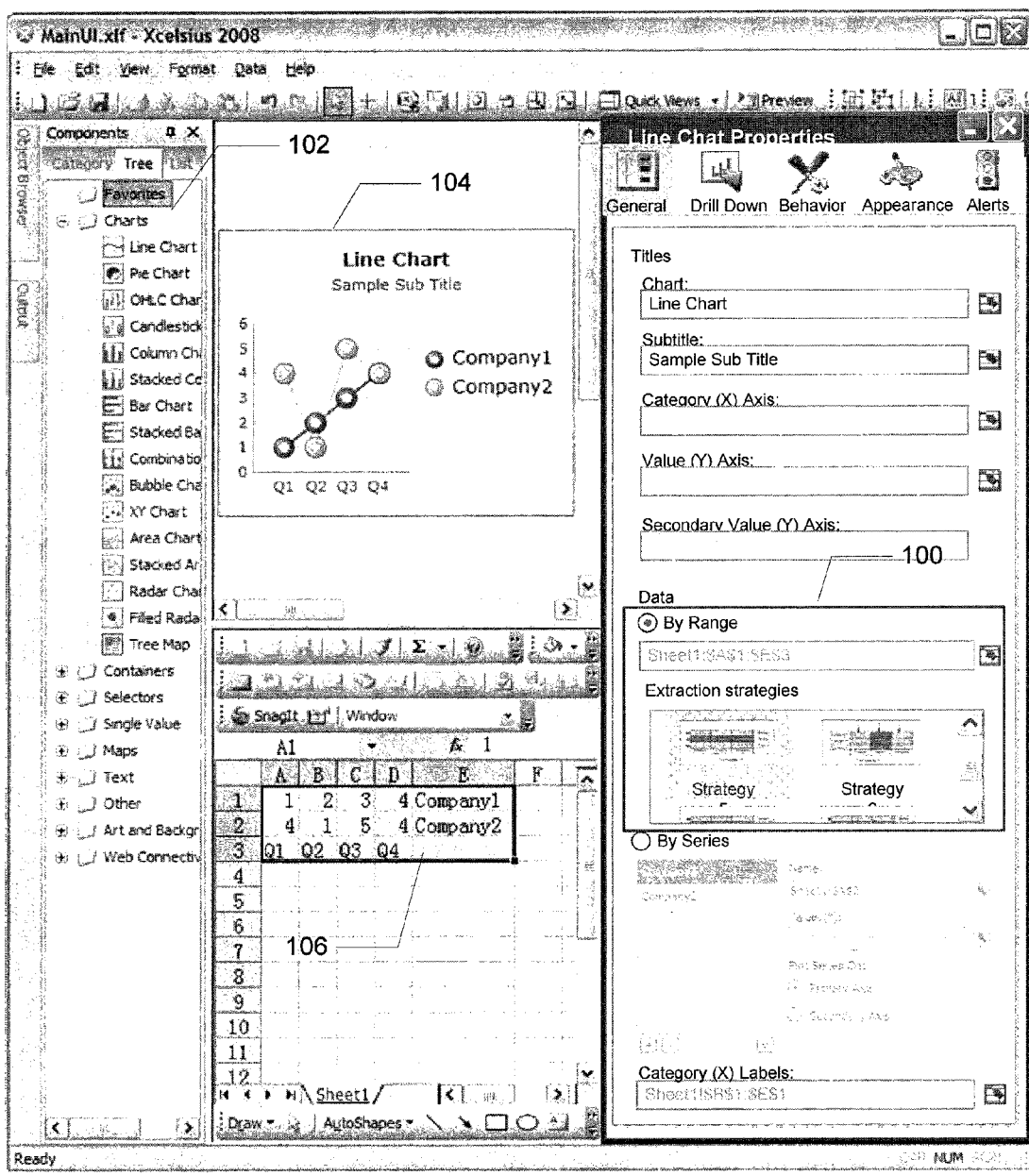
FIG. 2 illustrates an implementation of a visualization abstraction system.

FIG. 2 illustrates an implementation of a system 50. The system 50 includes a user interface 100, a visual analytics component 102, a dataset presentation 104 of a selected visual analytic, and a dataset 106. Each of these components of the system 50 can be displayed together within a graphical user interface of an application, for example, while being generated for the display from the same or different computing systems. Each of these components is described in further detail below.

Figure 3:
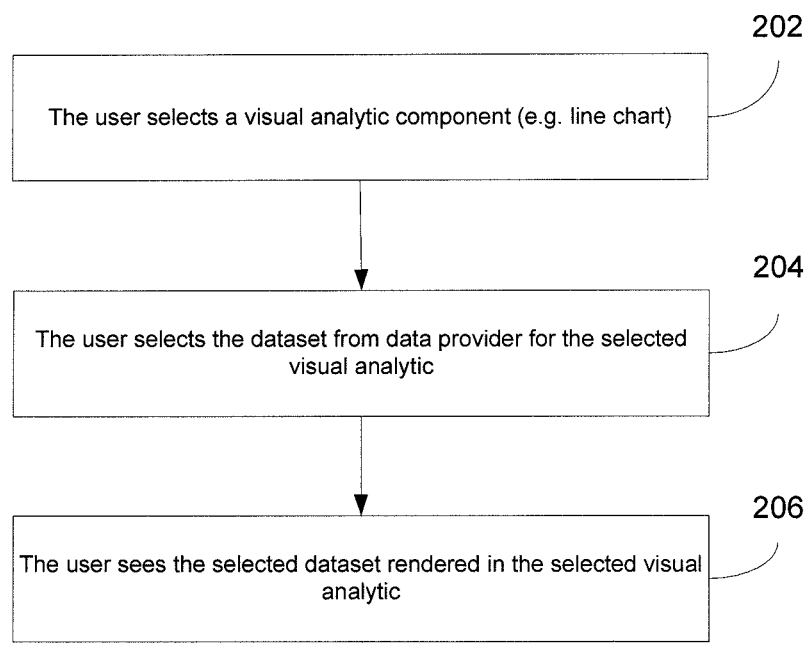
FIG. 3 illustrates a user workflow of the visualization abstraction system.

FIG. 3 illustrates a user workflow 200 of the system. At 202 a user selects a visual analytic component, and at 204 the user selects a dataset from a data provider for the selected visual analytic component. At 206, the user sees the selected dataset rendered in the selected visual analytic. After the user selects the visual analytic, the dataset is checked against its set of data extraction strategies, and the best match data extraction strategy is computed by the system. Then, the system extracts data representing one or more visualization points from the dataset, and formats the extracted data as metadata for consumption by the visual analytics engine.

Figure 4:
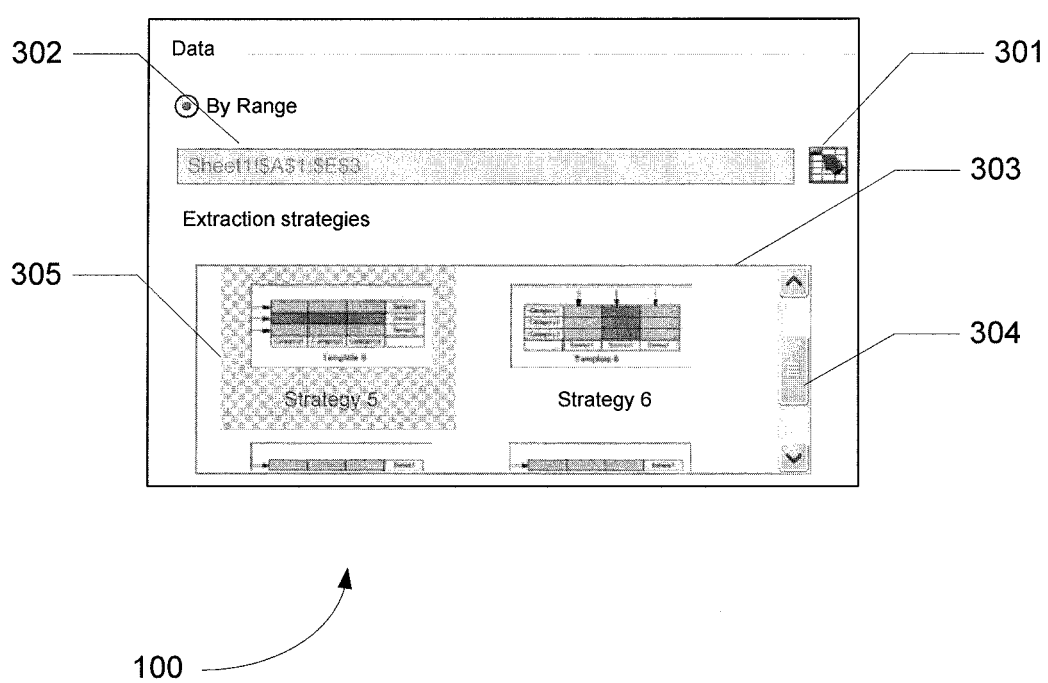
FIG. 4 is a detailed view of the user interface of a visualization abstraction system.

FIG. 4 is a detailed view of the user interface 100 of the system 50. The user interface 100 includes a user-selectable control button 301 that can be used to manually bind the dataset to the selected visual analytic. The user interface 100 further includes a user selection display 302 that displays a user-selected dataset, and a strategy pool presentation 303 that displays a set of data extraction strategies generated by the system 50. The strategy pool presentation 303 can be navigated by one or more scroll controls 304, while the selected strategy 305 is prominently displayed by being highlighted or by differentiating shading, etc.

Figure 5:
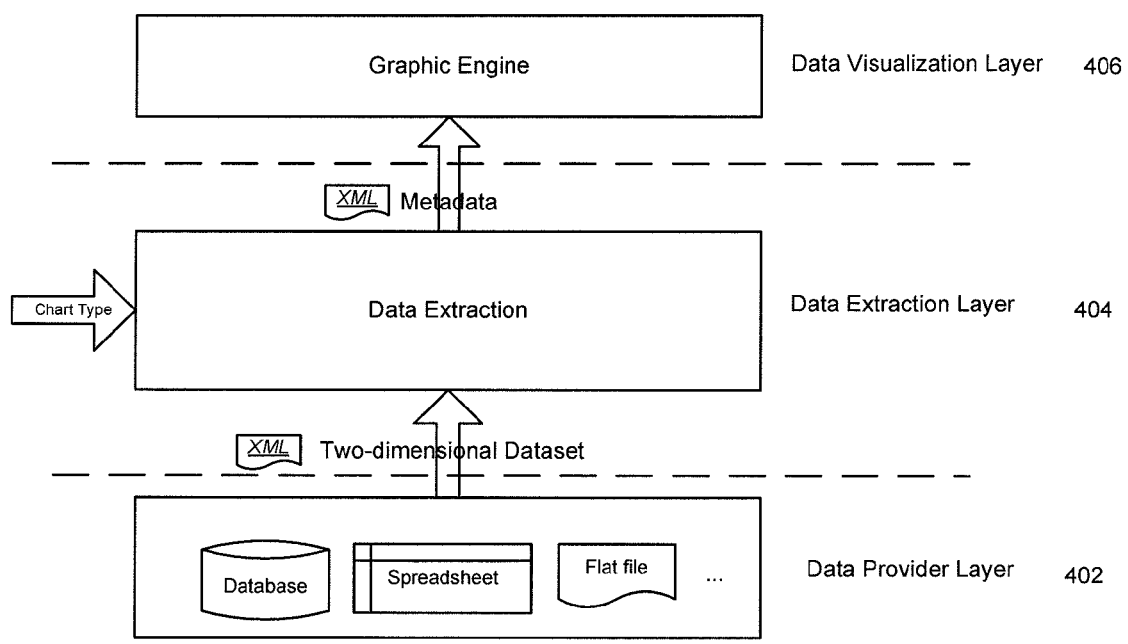
FIG. 5 shows a high-level architecture of a visualization abstraction system.

FIG. 5 shows a high-level architecture 400 of the system 50. The high-level architecture 400 includes a data provider layer 402, a data extraction layer 404, and a data visualization layer 406. Each of these layers of the high-level architecture 400 will now be described in more detail.

The data provider layer 402 provides the logical representation of the data provider. Its purpose is to abstract the data from a database, spreadsheet, or flat file, into a two-dimensional (i.e. row/column representation) dataset, which serves as the input to the data extraction layer 404. The data extraction layer 404 determines a visualization point from the two-dimensional dataset in order to best describe the user-selected visual analytics with a "best-match suggestion engine," and extracts the visualization point (e.g. Category Labels, Series Names and Series Data) from the dataset into a metadata with an "extraction engine." The data extraction layer 404 provides the metadata to a graphics engine, which forms the data visualization layer 406.

Figure 6:
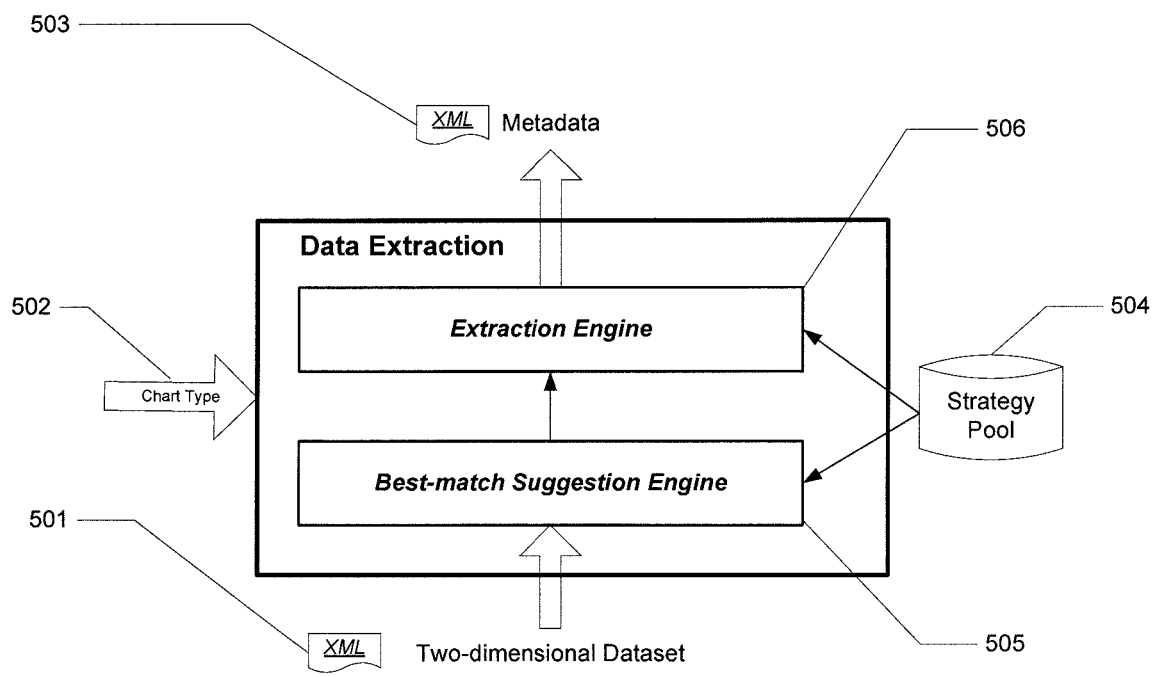
FIG. 6 shows a data extraction layer.

FIG. 6 shows the data extraction layer 404, having as an input a two dimensional dataset 501 represented by rows and columns. In one preferred exemplary implementation, the two dimensional dataset is an XML dataset that can be defined as follows:

```
<!ELEMENT DataSet (Row*)>
<!ELEMENT Row (Column*)>
<!ATTLIST Row rowId CDATA #REQUIRED>
<!ELEMENT Column (#PCDATA)>
<!ATTLIST Column columnId CDATA #REQUIRED>
<!ATTLIST Column formatting CDATA #REQUIRED>
```

The data extraction layer 404 can support several types of visual analytics 502, preferably in the form of charts. For example, the visual analytic 502 can be a one-dimensional chart, having a visualization point that contains a single value (x value), such as a line chart, column chart, bar chart, and/or area chart, etc. Alternatively, the visual analytic 502 can be a two-dimensional chart, having a visualization point that contains both an x value and a y value, such as an XY chart, etc. The visualization point of the visual analytic 502 is formatted into a metadata representation 503 for further consumption by the data visualization layer 406, and can be defined as follows:

```
<!ELEMENT MetaData (CategoryLabels?, SeriesArray)>
<!ATTLIST MetaData seriesCount CDATA #REQUIRED>
<!ELEMENT CategoryLabels (Label*)>
<!ELEMENT Label (#PCDATA)>
<!ATTLIST Label index CDATA #REQUIRED>
<!ATTLIST Label formatting CDATA #REQUIRED>
<!ELEMENT SeriesArray (Series+)>
<!ELEMENT Series (SeriesName?, SeriesData)>
<!ATTLIST Series seriesId CDATA #REQUIRED>
<!ELEMENT SeriesName (#PCDATA)>
<!ATTLIST SeriesName formatting CDATA #REQUIRED>
<!ELEMENT SeriesData (Data+)>
<!ELEMENT Data (#PCDATA)>
<!ATTLIST Data index CDATA #REQUIRED>
<!ATTLIST Data formatting CDATA #REQUIRED>
```

The data extraction layer 404 further includes a strategy pool 504 that stores a built-in strategy and/or user-defined strategies. A best-match suggestion engine 505 processes the given data set and visual analytic to generate a best match strategy for them, and then an extraction engine 506 extracts the dataset into one or more visualization points on the best-match strategy.

Figure 7:
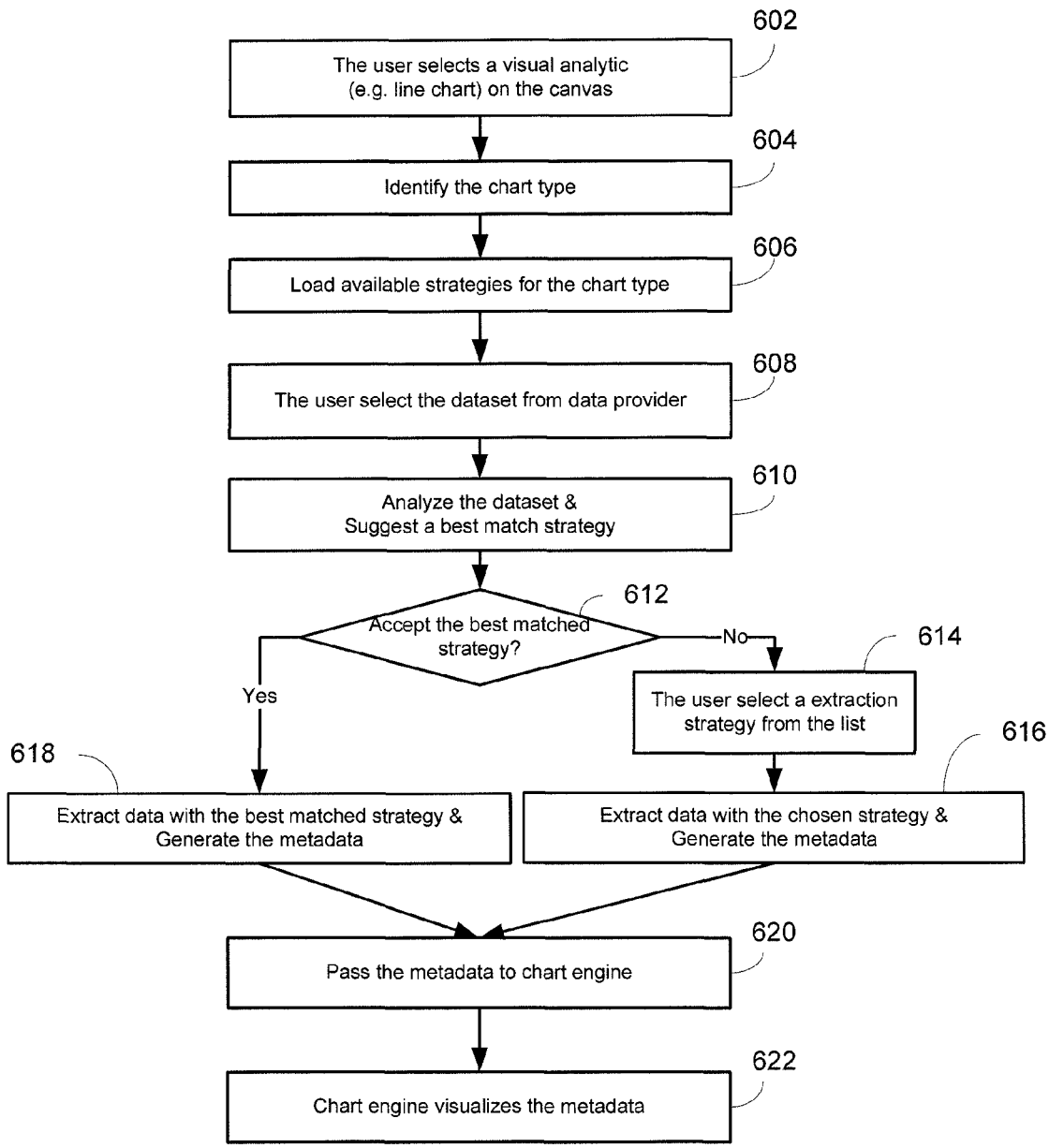
FIG. 7 is a flowchart showing a data flow within a data extraction layer.

FIG. 7 is a flowchart 600 showing a data flow within the data extraction layer of a visualization abstraction system. At 602, a user selects a visual analytic (i.e. a line chart) on a canvas displayed in a user interface. At 604, the chart type is identified by a user selection signal. At 606, the system loads available strategies for the selected visualization, i.e. based on the chart type. At 608, the system receives user input selection of a dataset from a data provider, and at 610, the system analyzes the dataset and suggests a best match strategy, which in turn is provided to the user.

At 612, user input determines whether to accept the best matched strategy. If the best matched strategy is not accepted, then at 614 the system can receive user input to select an extraction strategy from a list provided to the user, and thereafter at 616 the chosen strategy is used to extract data and generate metadata. If the best matched strategy is accepted, then the best matched strategy is used to extract data and generate metadata, at 618. At 620, the metadata is passed to the chart engine, and at 622 the chart engine visualizes the metadata, i.e. generates a visual analytic with visualization points defined by the metadata.

The Data Visualization Layer 406 includes the chart engine which can create the one-dimensional or two-dimensional visual representation (e.g. line chart, bar chart) based on the metadata from the Data Extraction Layer 404. The metadata describes the logical data structure (or visualization point) for the visualization (e.g. line chart, column chart, bar chart, XY chart) regardless of the original format of the dataset provided by the Data Provider Layer 402.

Figure 8:
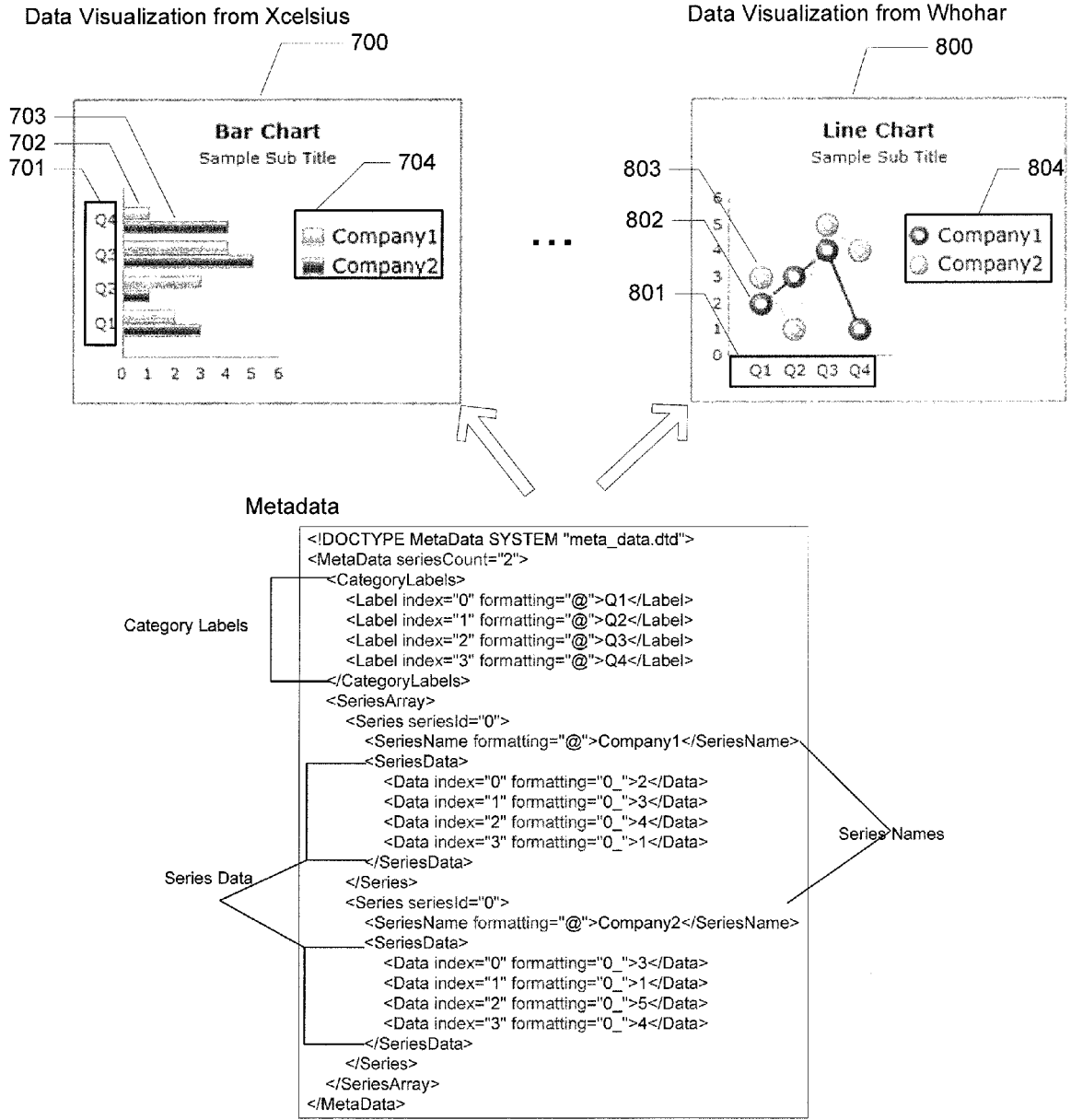
FIG. 8 shows an example of how two data consumers consume the same metadata.

FIG. 8 shows an example of how two data consumers like Xcelsius and Whohar could consume the same metadata generated according to implementations of the system and method described herein. One might generate a bar chart 700, while the other might generate a line chart 800, each having category labels (701, 801), data of series 1 (702, 802) and data of series 2 (703, 803).

Figure 9:
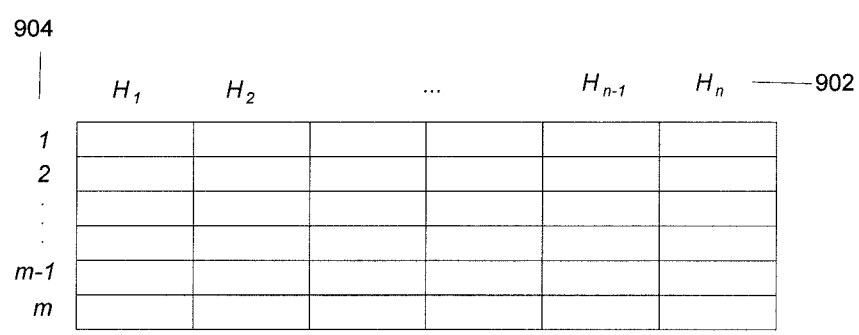
FIG. 9 shows a table with column and row indices.

In a preferred exemplary implementation, the strategy or strategies can be applied on m rows and n columns (e.g. m*n dataset), so the applied dataset of a given strategy can be defined as follows:

$$\begin{bmatrix} [H_11, H_21, \ldots, H_n1], \\ [H_12, H_22, \ldots, H_n2], \\ \ldots \\ [H_1m, H_2m, \ldots, H_nm] \end{bmatrix}$$

where, as shown in FIG. 9, $H_i(1 \le i \le n)$ is a column index 902 and $j(1 \le j \le m)$ is a row index 904.

The strategy pool stores all the available data extraction strategies including built-in strategy and user-defined strategy. A strategy defines a mapping relationship between visual analytics and datasets. Every strategy contains three portions: Category Labels, Series Names, and Series Data. The strategy can be defined formally as below:

$$\text{Strategy}(m \times n) = \left\{ \begin{array}{l} CategoryLabels = [Q_1q_1, Q_2q_2, \ldots, Q_wq_w] \\ SeriesData = \left[ series_i \cdot \left\{ \begin{array}{l} seriesName : Q_kq_k \\ data : [P_1p_1, P_2p_2, \ldots, P_vq_v] \end{array} \right\} \right] \end{array} \right\}$$

$(Q_j, P_j \in \{H_1, H_2, \ldots, H_n\}; q_j, p_j \in \{1, 2, \ldots, m\};$ $m, n, w, k, v, j \in N; 2 \leq m \leq \infty; 2 \leq n \leq \infty;)$ Below is the XML/DTD of an exemplary strategy:

```
<!ELEMENT Strategy (Prerequisite?, SeriesCategory, Series)>
<!ATTLIST Strategy name CDATA #REQUIRED>
<!ATTLIST Strategy description CDATA #REQUIRED>
<!ELEMENT Prerequisite EMPTY>
<!ATTLIST Prerequisite minRow CDATA #IMPLIED>
<!ATTLIST Prerequisite maxRow CDATA #IMPLIED>
<!ATTLIST Prerequisite minColumn CDATA #IMPLIED>
<!ATTLIST Prerequisite maxColumn CDATA #IMPLIED>
<!ELEMENT SeriesCategory EMPTY>
<!ATTLIST SeriesCategory orientation (horizontal|vertical) "horizontal">
<!ATTLIST SeriesCategory row CDATA #IMPLIED>
<!ATTLIST SeriesCategory startColumn CDATA #IMPLIED>
<!ATTLIST SeriesCategory endColumn CDATA #IMPLIED>
<!ATTLIST SeriesCategory column CDATA #IMPLIED>
<!ATTLIST SeriesCategory startRow CDATA #IMPLIED>
<!ATTLIST SeriesCategory endRow CDATA #IMPLIED>
<!ELEMENT Series (Rule+)>
<!ATTLIST Series startRow CDATA #REQUIRED>
<!ATTLIST Series endRow CDATA #REQUIRED>
<!ATTLIST Series startColumn CDATA #REQUIRED>
<!ATTLIST Series endColumn CDATA #REQUIRED>
<!ATTLIST Series seriesCount CDATA #REQUIRED>
<!ATTLIST Series dataSize CDATA #REQUIRED>
<!ELEMENT Rule (Condition?, SeriesName, SeriesData+)>
<!ATTLIST Rule name CDATA #REQUIRED>
<!ELEMENT Condition (#PCDATA)>
<!ELEMENT SeriesName EMPTY>
<!ATTLIST SeriesName value CDATA #IMPLIED>
<!ATTLIST SeriesName row CDATA #IMPLIED>
<!ATTLIST SeriesName column CDATA #IMPLIED>
<!ELEMENT SeriesData EMPTY>
<!ATTLIST SeriesData index CDATA #REQUIRED>
<!ATTLIST SeriesData orientation (horizontal|vertical) "horizontal">
<!ATTLIST SeriesData row CDATA #IMPLIED>
<!ATTLIST SeriesData startColumn CDATA #IMPLIED>
<!ATTLIST SeriesData endColumn CDATA #IMPLIED>
<!ATTLIST SeriesData column CDATA #IMPLIED>
<!ATTLIST SeriesData startRow CDATA #IMPLIED>
<!ATTLIST SeriesData endRow CDATA #IMPLIED>
```

As depicted in FIG. 10, a strategy 1 can be described as shown. As an XML format, strategy 1 can be represented as follows:

```
<?xml version="1.0"?>
<!DOCTYPE Strategy SYSTEM "series.dtd">
<Strategy name="one dimensional chart extraction" description="">
    <Prerequisite minRow="2" minColumn="2"/>
    <SeriesCategory orientation="horizontal" row="1" startColumn="1" endColumn="{rangeColumnCount}"/>
    <Series startRow="2" endRow="{Range.rowCount}" startColumn="1" endColumn="{rangeColumnCount}" seriesCount="{dataRangeRowCount/2}" dataSize="1">
        <Rule name="series_i">
            <SeriesName value="Series {seriesIndex}"/>
            <SeriesData index="1" orientation="horizontal" row="{seriesIndex}" startColumn="2" endColumn="{dataRangeColumnCount}"/>
        </Rule>
    </Series>
</Strategy>
```

Figure 11:
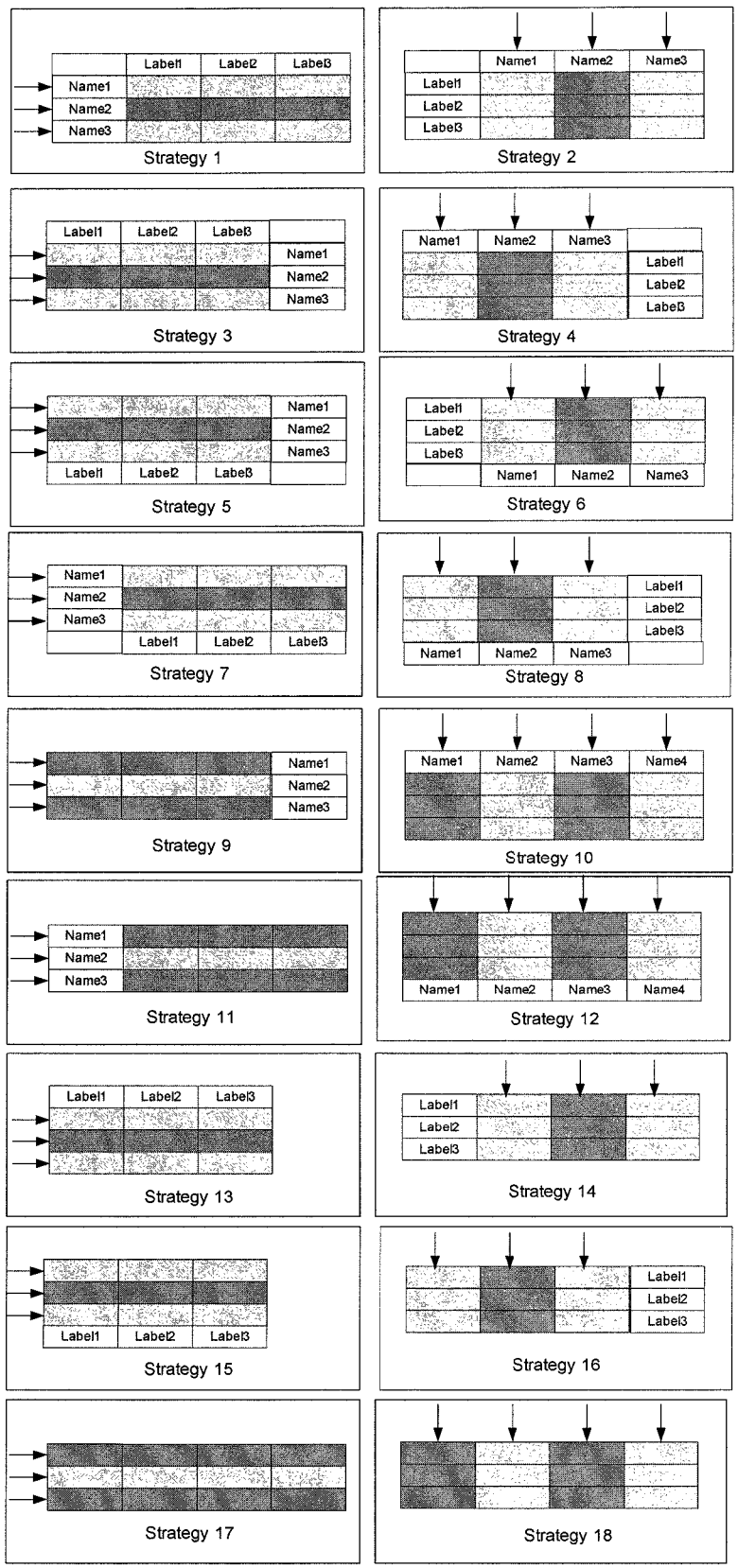
FIG. 11 shows a list of built-in and newly-generated strategies for a one-dimensional chart.
Figure 12:
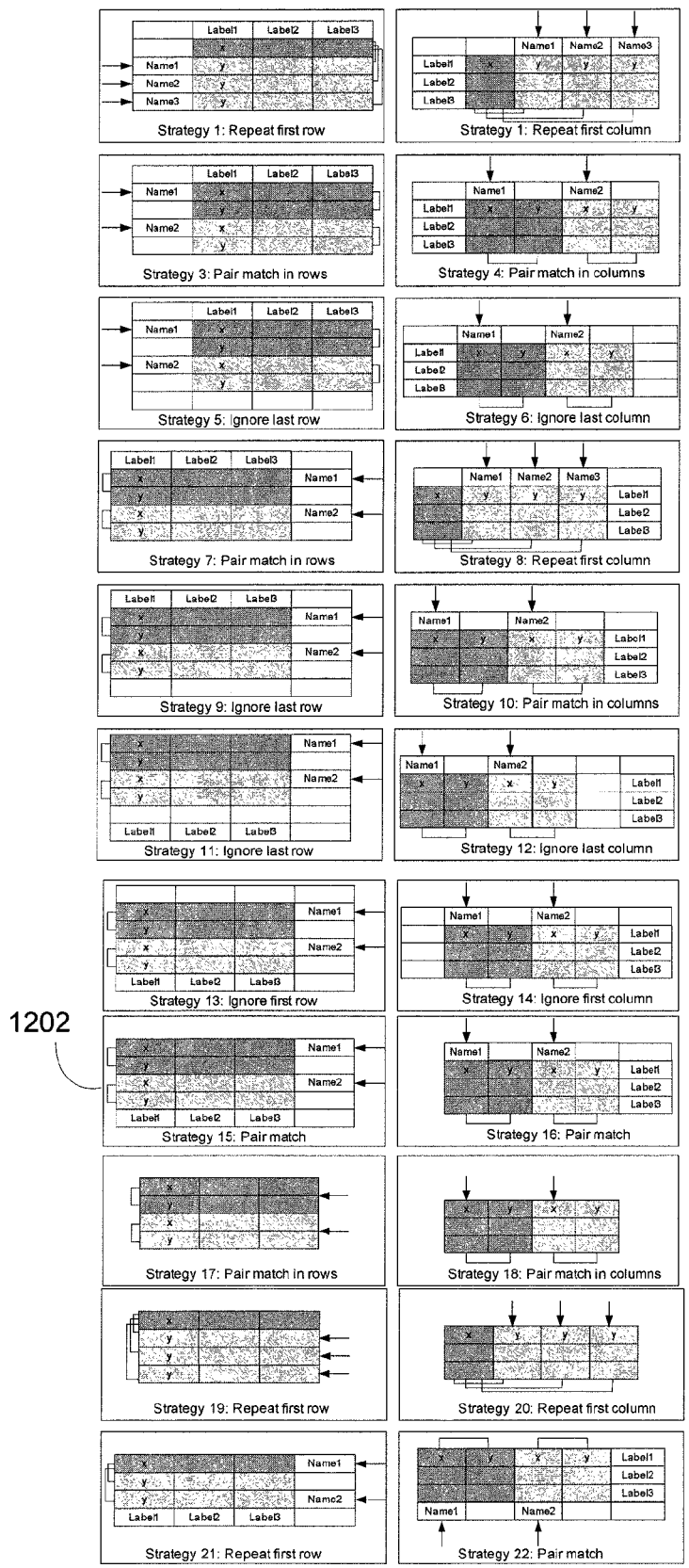
FIG. 12 shows a list of built-in and newly-generated strategies for a two-dimensional chart.

The system can define at least one built-in strategy to handle both common and complex dataset representation. In an exemplary implementation, the system provides 16 built-in strategies for a one-dimensional chart. FIG. 11 lists all built-in strategies for the one-dimensional chart, while Strategies 3, 4, 5, 6, 7, 8, 9, 12, 15 and 16 are newly generated and unique. FIG. 12 lists the built-in strategies for two-dimensional charts, while all strategies are unique to the presently described implementations, except Strategy 1 and Strategy 2.

Two algorithms are used in the systems and methods, including a "best-match strategy" in the suggestion engine, and a "metadata data extraction" in the extraction engine. The best-match strategy algorithm determines the best strategy by first identifying the Series Names and Category Labels within the dataset, and then finding out the best strategy for the data extraction according to the decision tree mentioned below.

The dataset can be divided into five regions, as shown in the example depicted in FIG. 13, which shows the best-match strategy in detail. The five regions can be: middle, top, bottom, left and right. In some implementations, the Category Labels and Series Names can only appear in the top, left, right or bottom region and are of type string. However, the Category Labels and Series Names should not both appear on top and bottom region, nor both appear on the left and right region. For example, if the Category Labels appear in the top region, then the Series Names should not appear on the bottom region. Therefore, there might be nine possible arrangements of Series Names and Category Labels within any given dataset 1010. The algorithm below is the pseudo-code for the best match algorithm, which takes the dataset and the chart type of the selected visual analytic as the input parameter and outputs the best match strategy for the given dataset:

| Algorithm 1: Best match strategy algorithm |
| --- |
| 1  Input: dataset, chartType |
| 2  Output: best match strategy |
| 3  calculateBestMatchStrategy(dataset, chartType) |
| 4  { |
| 5      Parse the dataset; |
| 6      Get top, bottom, left and right region; |
| 7 |
| 8      if(top is string) tag_top = 1; else tag_top = 0; |
| 9 |
| 10     if(bottom is string) tag_bottom = 1; else tag_bottom = 0; |
| 11 |
| 12     if(left is string) tag_left = 1; else tag_left = 0; |
| 13 |
| 14     if(right is string) tag_right = 1; else tag_right = 0; |
| 15 |
| 16     switch(chartType) |
| 17     { |
| 18         1D chart: |
| 19         bestMatchStrategy = Find best match strategy in one dimensional chart best match strategy decision-tree; |
| 20         break; |
| 21 |
| 22         2D chart: |

| Algorithm 1: Best match strategy algorithm |
| --- |
| 23         bestMatchStrategy = Find best match strategy in two dimensional chart best match strategy decision-tree; |
| 24            break; |
| 25        } |
| 26 |
| 27     return bestMatchStrategy; |
| 28 } |

Figure 14:
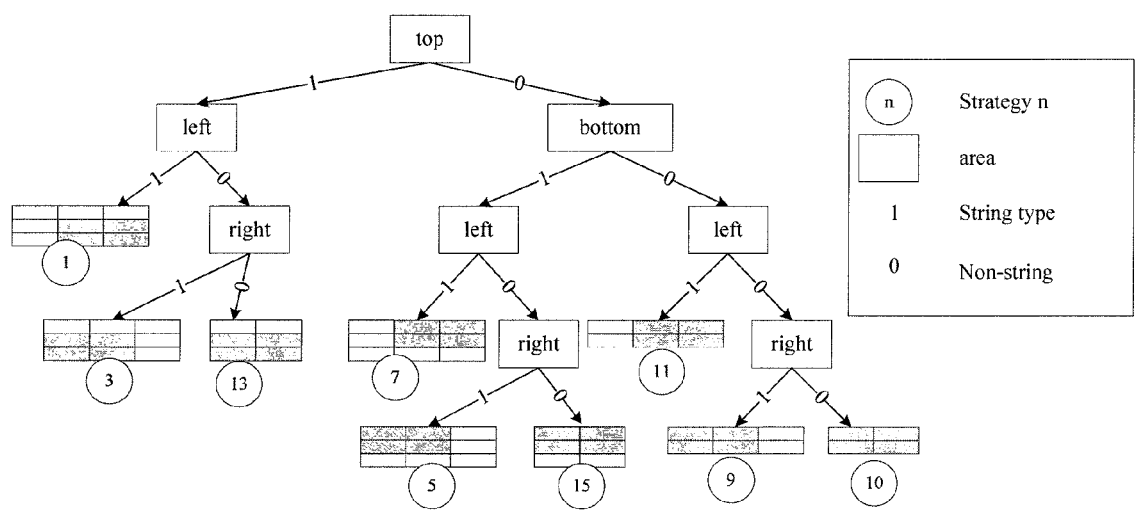
FIG. 14 depicts a decision tree for a one-dimensional chart.

The decision tree in FIG. 14 depicts the overall algorithm for a one-dimensional chart. Validating the data type of the top region of the input dataset is the first step, and the algorithm traverses the tree until it reaches the leaf node where the best strategy is found.

Figure 15:
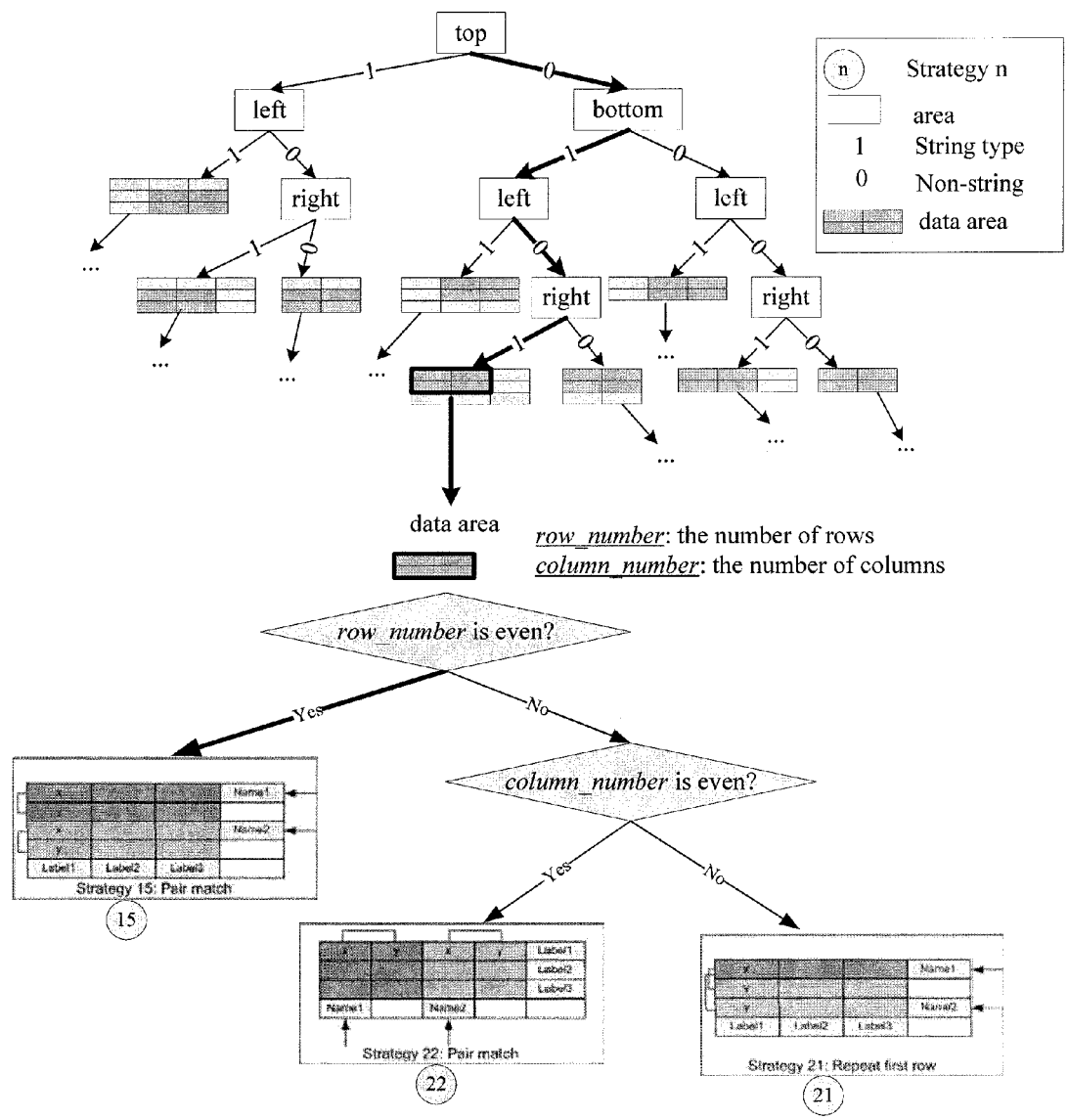
FIG. 15 illustrates a decision tree for a two-dimensional chart as implemented in a multi-step decision process.

FIG. 15 illustrates a decision tree for a two-dimensional chart, which is implemented in a multi-step decision process. First, the one-dimensional decision-tree is used to identify the Category Labels, Series Name and Series Data within the dataset. The leaf node, in this case, would lead to a next step, rather than the best strategy. Next, the number of rows and columns of the data area (i.e. Series Data) are checked to find out the best strategy. For example, from the first step, if the data area is identified on the bottom/right region and both regions are of type string, then if the number of rows in the data area is even in this second step, then Strategy 15 (1202) is determined as the best match strategy.

The following algorithm is used to extract the visualization point from the dataset into the metadata according to the selected strategy above.

| Algorithm 2: Extracting algorithm |
| --- |
| 1     Input: dataset, best match strategy |
| 2     Output: metadata |
| 3     extracteDataByStrategy(dataset, strategy) |
| 4     { |
| 5       Parse the strategy. |
| 6 |
| 7       Parse the dataset, get the number of rows and columns of the dataset; |
| 8 |
| 9       // Instantiate the m & n of the strategy |
| 10      strategy.m = dataset.row_number; |
| 11      strategy.n = dataset.column_number; |
| 12 |
| 13      Compute Category Labels, Series Names and Series Data; |
| 14 |
| 15      Compose metadata; |
| 16 |
| 17      return metadata; |
| 18    } |
| 19 |

The Strategy Pool stores a set of built-in strategies which covers the most common scenarios. At the same time, the user can create their own strategy, and save it to the Strategy Pool as an XML representation. There are at least three ways for the user to create their own strategy: 1) Write out the strategy which conforms to the DTD/XML description above; 2) Use a built-in XML tool to create the Strategy xml file; 3) Use a graphical editor to generate the Strategy XML on the fly.

Figure 16:
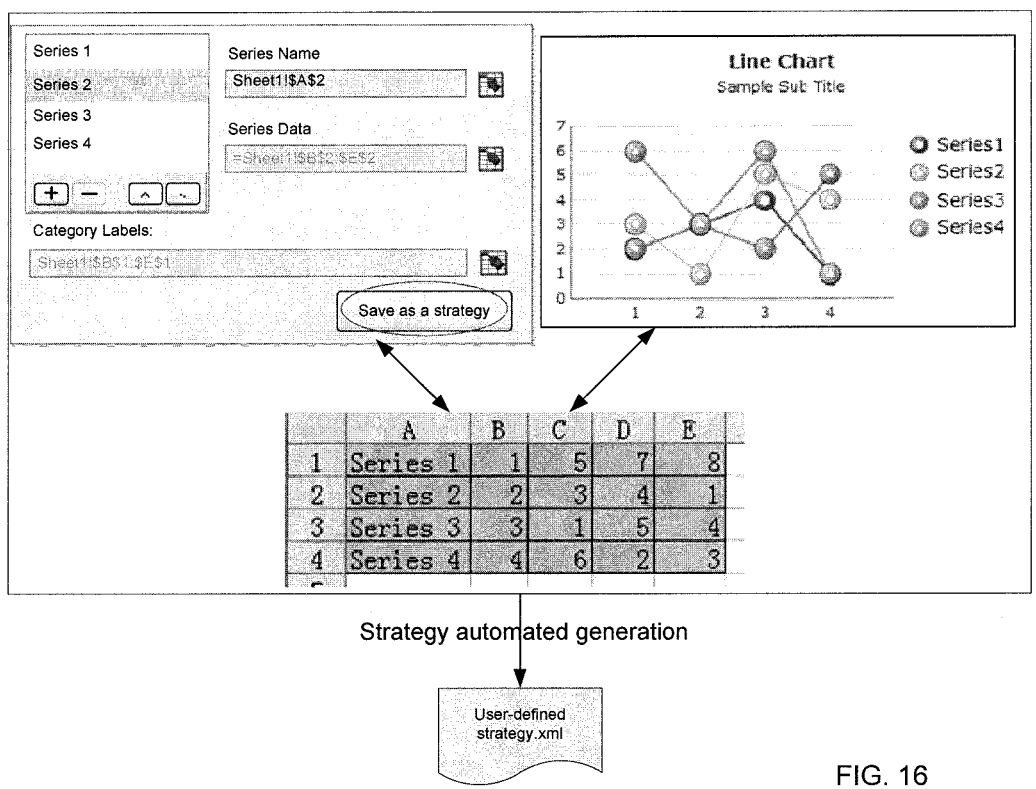
FIG. 16 illustrates a workflow of generating a user-defined strategy.

FIG. 16 illustrates the workflow of generating the user-defined strategy. The user can create a new strategy by binding the dataset (e.g. Series Names, Series Data and Category Labels) manually to the visual analytics and then by clicking on the "Save as a strategy" button. The user-defined strategy is then generated and stored automatically by the strategy generation module.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A method for abstracting a best visualization point describing a selected visual analytic from an arbitrary two-dimensional dataset, the method being implemented by at least one data processor forming part of at least one computing system and comprising:
   abstracting data accessed from a data source into a two-dimensional dataset comprising rows and columns;
   determining the best visualization point from the two-dimensional dataset, the determining comprising applying a best strategy of one or more visualization strategies stored in and accessed from a strategy pool database;
   formatting the visualization point as metadata, the formatting comprising:
      parsing the two-dimensional dataset to obtain a number of rows and a number of columns in the two-dimensional dataset;
      instantiating the best strategy by applying a dataset row number and a dataset column number to the number of rows and the number of columns;
      computing category labels, series names, and series data from the parsed two-dimensional dataset; and
      composing the metadata to describe the best visualization point describing the selected visual analytic; and
   providing the metadata to a graphics engine for generating a one-dimensional or two-dimensional visual representation of the two-dimensional dataset based on the metadata.

2. The method of claim 1 further comprising:
   receiving user input identifying a chart type that is selected from a chart type group that consists of a one-dimensional graphical chart and a two-dimensional graphical chart respectively defining the one-dimensional or two-dimensional visual representation of the two-dimensional dataset.

3. The method of claim 1, further comprising:
   generating a display of the best strategy for presentation to a user.

4. The method of claim 1, further comprising:
   accessing the one or more visualization strategies from the strategy pool database based on a chart type selected by a user of the data processing apparatus.

5. The method of claim 4 further comprising:
   displaying a graphical user including a region for displaying a one-dimensional or two-dimensional visual representation of the two-dimensional dataset.

6. A non-transitory computer program product for abstracting a best visualization point describing a selected visual analytic from an arbitrary two-dimensional dataset, the computer program product storing instructions which, when executed by at least one data processor forming part of at least one computing system, result in operations comprising:
   abstracting data accessed from a data source into a two-dimensional dataset comprising rows and columns;
   determining the best visualization point from the two-dimensional dataset, the determining comprising applying a best strategy of one or more visualization strategies stored in and accessed from a strategy pool database;

formatting the visualization point as metadata, the formatting comprising:
  parsing the two-dimensional dataset to obtain a number of rows and a number of columns in the two-dimensional dataset;
  instantiating the best strategy by applying a dataset row number and a dataset column number to the number of rows and the number of columns;
  computing category labels, series names, and series data from the parsed two-dimensional dataset; and
  composing the metadata to describe the best visualization point describing the selected visual analytic; and
providing the metadata to a graphics engine for generating a one-dimensional or two-dimensional visual representation of the two-dimensional dataset based on the metadata.

7. The computer program product of claim 6, wherein the operations further comprise:
  receiving user input identifying a chart type that is selected from a chart type group that consists of a one-dimensional graphical chart and a two-dimensional graphical chart respectively defining the one-dimensional or two-dimensional visual representation of the two-dimensional dataset.

8. The computer program product of claim 6, wherein the operations further comprise:
  generating a display of the best strategy for presentation of a user of the data processing apparatus.

9. The computer program product of claim 6, wherein the operations further comprise:
  accessing the one or more visualization strategies from the strategy pool database based on a chart type selected by a user of the data processing apparatus.

10. The computer program product of claim 9, wherein the operations further comprise:
  displaying a graphical user including a region for displaying a one-dimensional or two-dimensional visual representation of the two-dimensional dataset.

11. A method for implementation by one or more data processors forming part of at least one computing system, the method comprising:
  receiving data comprising a dataset and a chart type for a selected visual analytic;
  parsing the dataset to characterize regions of the dataset;
  determining, based on the parsed dataset and the chart type and using a best match strategy decision tree, a best match strategy among a pool of available strategies, the determining comprising traversing the best match strategy decision tree until a leaf node is reached that corresponds to the determined best match strategy, the traversing of the best match strategy decision tree comprising first identifying category labels, series name, and series data within the data set and second checking rows and columns of the data area to identify the best match strategy; and
  providing data specifying the determined best match strategy.

12. The method of claim 11, wherein the providing data comprises at least one of: displaying the data specifying the determined best match strategy, transmitting the data specifying the determined best match strategy to a remote computing system, or storing the data specifying the determined best match strategy.

13. The method of claim 11 further comprising:
  receiving user-generated input selecting the determined best match strategy; and
  extracting data from the data set and generating associated metadata.

14. The method of claim 13 further comprising:
  passing the metadata to a chart engine; and
  generating, by the chart engine, a visual analytic with visualization points defined by the metadata.

\* \* \* \* \*